United States Patent [19]

Whitener

[11] 4,395,450
[45] Jul. 26, 1983

[54] COMPOSITE STRUCTURAL SKIN SPAR JOINT AND METHOD OF MAKING

[75] Inventor: Philip C. Whitener, Seattle, Wash.

[73] Assignee: The Boeing Company, Seattle, Wash.

[21] Appl. No.: 333,247

[22] PCT Filed: Sep. 30, 1981

[86] PCT No.: PCT/US81/01319
§ 371 Date: Sep. 30, 1981
§ 102(e) Date: Sep. 30, 1981

[87] PCT Pub. No.: WO83/01238
PCT Pub. Date: Apr. 14, 1983

[51] Int. Cl.³ .............................. B64C 3/18; B32B 5/00
[52] U.S. Cl. ..................................... 428/116; 156/201; 156/275.5; 244/123; 244/131; 428/119
[58] Field of Search ............ 156/197, 201, 272, 304.1, 156/304.2, 304.3; 244/123, 131; 428/116, 119

[56] References Cited

U.S. PATENT DOCUMENTS

| | | | |
|---|---|---|---|
| 3,771,748 | 11/1973 | Jones | 428/116 |
| 3,950,115 | 4/1976 | Euler | 428/116 |
| 4,151,031 | 4/1979 | Goad et al. | 156/201 |
| 4,253,898 | 3/1981 | Rinker et al. | 156/272 |
| 4,284,443 | 8/1981 | Hilton | 156/197 |

Primary Examiner—William J. Van Balen
Attorney, Agent, or Firm—Morris A. Case; B. A. Donahue

[57] ABSTRACT

A resin impregnated woven fabric extends the length of a joint with a pair of spaced apart panels intersecting and interwoven with an intermediate laterally extending panel. A reinforcing core extends between the spaced apart panels on one side of the laterally extending panel. Three cores are located on the other side of the laterally extending panel. The intermediate core of the three is located between the two spaced apart panels and is reinforced to provide torsional load resistance. The other two cores are reinforced to provide varying load bearing properties in a spanwise direction.

16 Claims, 8 Drawing Figures

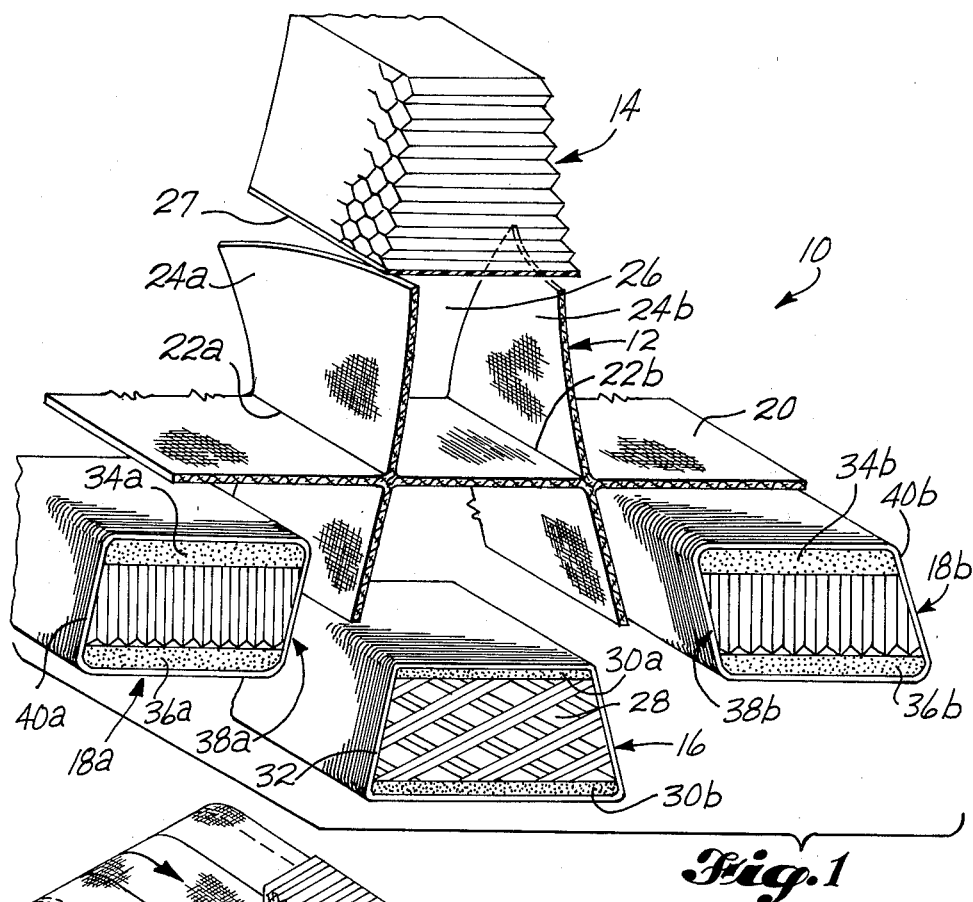
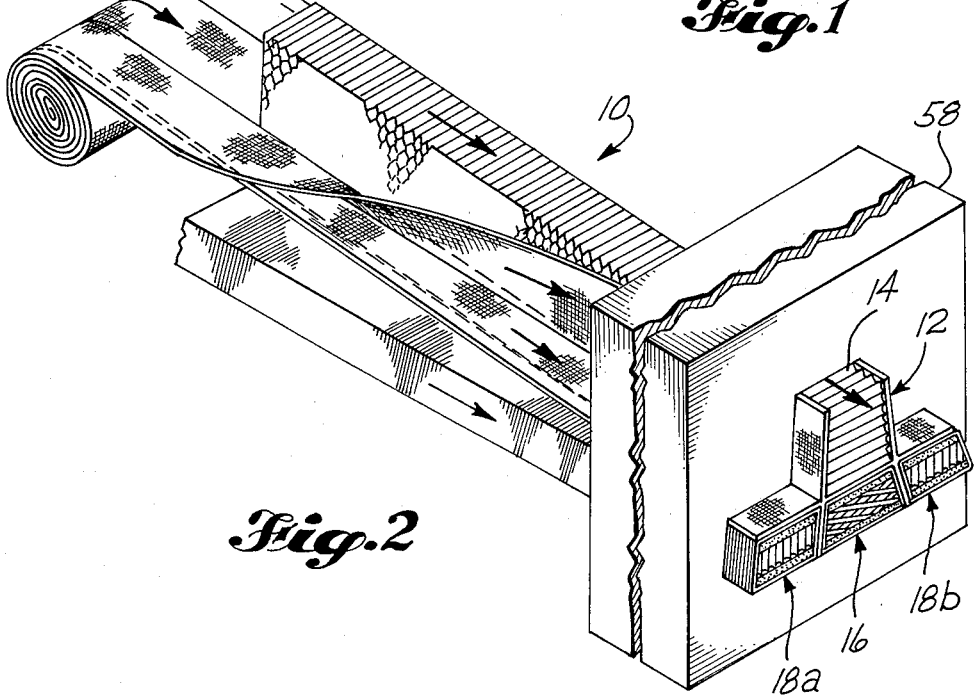

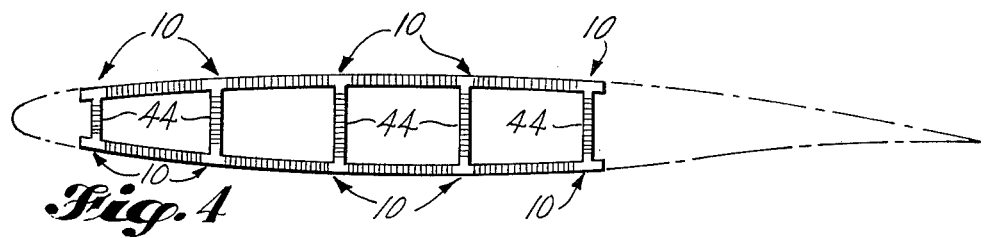
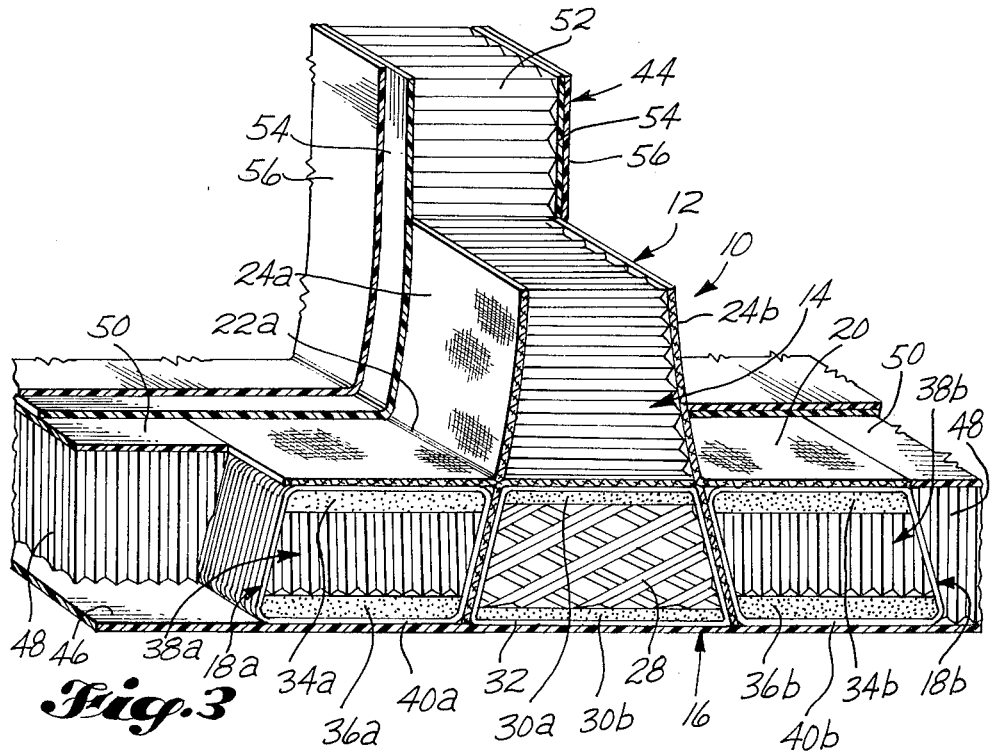

COMPOSITE STRUCTURAL SKIN SPAR JOINT AND METHOD OF MAKING

BACKGROUND OF THE INVENTION

The high strength to weight ratio of composite components make the composites attractive for use on airplanes. However, the joints between composite components involve one of the most difficult problems of adapting the composites to the manufacture of airplanes. These problems are severely multiplied when the joints are highly stressed in several directions. It was found that a composite skin-spar joint could be prepared that not only lends itself to providing a low weight high strength joint for any composite, but it is particularly attractive for use in aircraft wings. The joint when integrated makes spars that carry the loads without the need for ribs.

SUMMARY OF THE INVENTION

A composite skin-spar joint has a resin impregnated interwoven fabric with a pair of spaced apart spanwise extending panels, and a bisecting laterally extending interwoven panel that extends laterally to each side. Three cores are joined to one side of the laterally extending panel. The intermediate core extends between and is joined to the spaced apart panels, and has directional reinforcement to handle torsional loads. The other two cores have reinforcement to handle varying loads in a spanwise direction. A fourth core is located adjacent to the intermediate core and is joined to the three panels.

DESCRIPTION OF THE DRAWINGS

FIG. 1 shows a fragmented exploded perspective view of the composite skin-spar joint.

FIG. 2 shows a fragmented perspective view of the skin-spar joint being formed.

FIG. 3 shows a fragmented perspective view of the composite skin-spar joint of FIG. 1 joined to parts of a wing.

FIG. 4 shows a cross-sectional side elevational view of skin-spar joint joined in a wing of an airplane.

DETAILED DESCRIPTION

Figure 5:
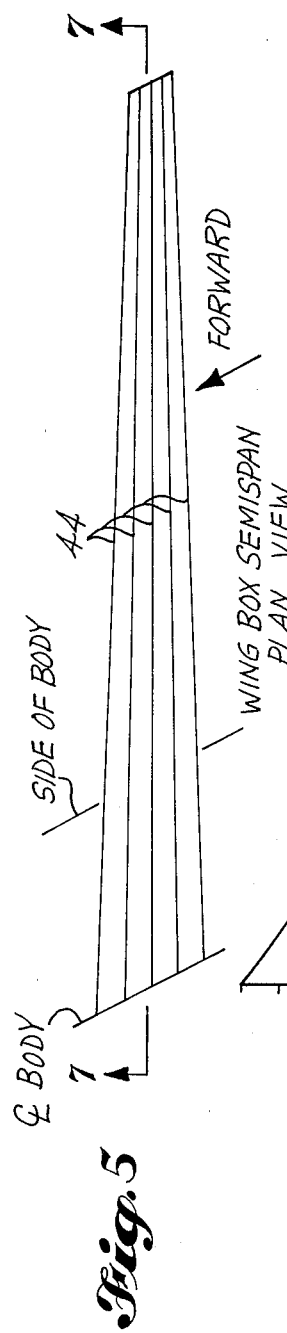
FIG. 5 shows a schematic plan view of a wing of an airplane using the composite skin-spar joint.

Composite skin-spar joint 10, is made up of resin impregnated interwoven fabric 12, cores 14, and 16, and chords 18a and 18b.

The interwoven fabric 12 is prepared from any of the known reinforcing fibers such as, but not limited to, fiberglass and graphite, and will be impregnated with any of the known resins, such as but not limited to, phenolic or epoxy resin. The impregnated fabric extends for the length of the desired span for the joint, is essentially H-shaped in cross section, and has fiber orientation that is predominately transverse. The fabric has a panel 20 that extends laterally and is bisected at 22a and 22b where it is interwoven with a pair of spaced apart panels 24a and 24b. The two spaced apart panels preferably have the spacing increase as the panels extend outward.

Core 14 is directly in contact with all three layers of the fabric, is located in the web area 26, and is preferably of a honeycomb material. A plastic potting compound 27 is preferably used between the core and panel 20.

On the opposite side of panel 20 and in contact with all the panels is an intermediate core 16; which is a fabricated core. It has a center 28 of honeycomb; which is aligned in a crisscrossing pattern to resist shear due to lateral bending, and a reinforced plastic top layer 30a and a bottom layer 30b. A covering 32 of a resin impregnated wound fiber may be used.

Figure 7:
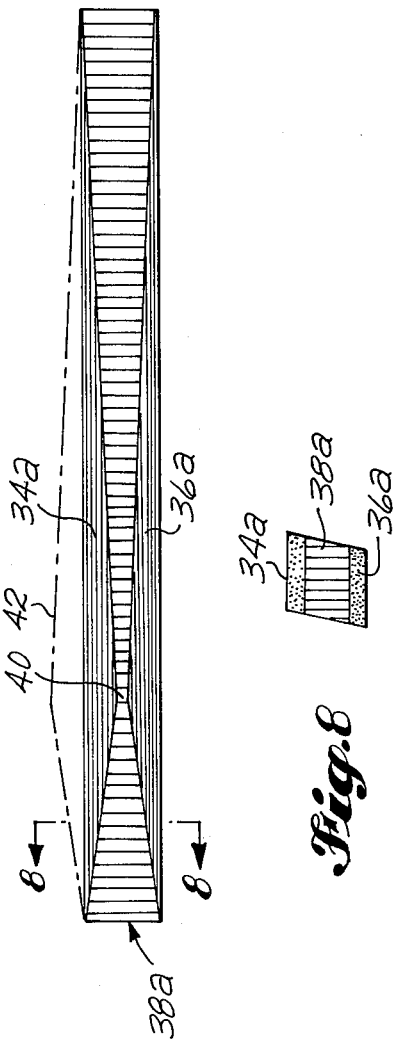
FIG. 7 shows a side elevational view of one of the chords, without a cover, making up the composite skin-spar joint.
Figure 8:
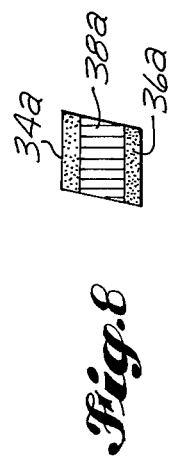
FIG. 8 is a cross-sectional view taken along line 8—8 of FIG. 7.

Chords 18a and 18b are located to the right and left of the intermediate core 16, and are fabricated chords. Those chords respectively have top layer 34a and 34b and bottom layer 36a and 36b; which are each made from reinforced plastics and are precured before assembly. There is honeycomb 38a and 38b between the layers and the cores have a wrapping 40a and 40b of resin impregnated reinforcing fibers. Various materials can be used to prepare the cores and the chords, however, the preferred material for the honeycomb is a glass fiber treated with a heat resistant phenolic resin, and the preferred reinforcement is graphite and the preferred resin is an epoxy. These chords are prepared in a manner to vary the load bearing capacity along the length of the span. FIGS. 7 and 8 show a build up of core 18a. First, the bottom layer 36a is laid up using epoxy resin impregnated graphite fibers that are oriented in a zero direction or, in other words, in a spanwise direction. The thickness of the layer is varied to be the thickest at the point of greatest load 40. Next, honeycomb 38 is placed on the bottom layer and secured there by setting up the resin in the layer. When thus joined the honeycomb extends along the phantom line 42.

The honeycomb is then machined to shape. Next, a matching shaped top reinforced layer 34a is placed on top of the machined honeycomb, and the resin impregnated reinforcing fibers 40a are wrapped around it to make up the chords having constant outside dimensions, but varying load bearing properties in the spanwise direction. It is necessary to redistribute the spar chords into the skin. This is accomplished by bond between the spar chord and the skin. As the load is transferred the number of fibers in the chords are reduced until all the load is distributed into the skin.

Figure 6:
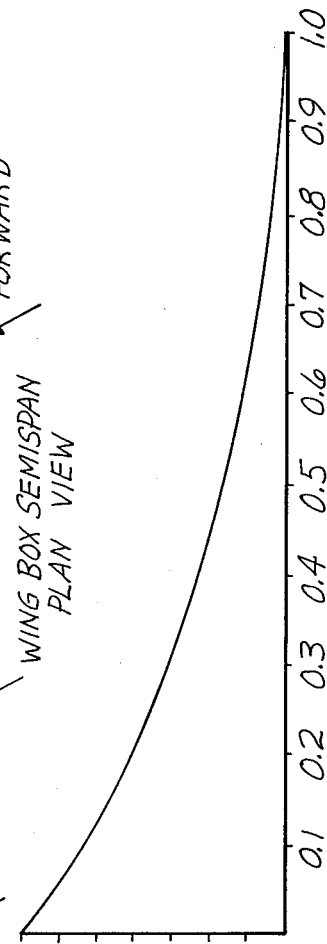
FIG. 6 is a graph showing the wing bending moment for the wing of FIG. 5.

FIG. 4 shows the skin-spar joint for use in an airplane wing. In that figure joints 10 are used top and bottom to make up spars 44. FIG. 5 shows a schematic plan view of the same wing with the five spars 44 extending to the centerline of the body of the airplane, and FIG. 6 shows a graph of the bending moment for the wing of FIG. 5. FIG. 3 shows the skin-spar joint 10 in a typical join with a face skin 46, adjoining honeycomb 48, reinforcing cover 50, spar web 52 of honeycomb, reinforced cover sheet 54 and fuel resistant lining 56.

Reinforcing cover sheets 54 have loads normal to the wing chord plane or to the axis of the spar chord. These loads are transferred from these cover sheets into the fabric panels 24a and 24b.

FIG. 2 shows the interwoven fabric 12 and the cores 14 and 16 and chords 18a and 18b being combined into the skin-spar joint 10. The cores, chords, and fabric are placed in proper relation to each other, and guided into the curing section 58 of a microwave generator, not shown. As the joint is being pulled through the ceramic dies in the curing section of the generator the resins in the assembly are cured to form the composite skin-spar joint.

We claim:

1. A composite skin-spar joint comprising: an elongated essentially T-shaped cross section having a wide body and thick arms, a resin impregnated woven fabric panel to extend straight across the underside of the arms and interwovenly intersecting a pair of resin impregnated woven fabric panels along the outside of the body that extend through the arms, a reinforcing core contacting all the panels in the body area, a second reinforcing core contacting all the panels in the area of the extension of the pair of panels, a pair of reinforcing chords in the arms adjacent the second core, and the resins cured to make up a composite skin-spar joint.

2. A composite skin-spar joint as in claim 1 further comprising the pair of resin impregnated fabric panels having a spacing that varies to move farther apart as the panels extend upward.

3. A composite skin-spar joint as in claim 2, further comprising: the pair of reinforcing chords in the arms having varying load bearing properties in a spanwise direction.

4. A composite skin-spar joint as in claim 2, wherein the pair of reinforcing chords in the arms each comprise: a top and bottom face sheet of reinforced plastic, a nonmetallic honeycomb between the face sheets, and a resin impregnated fiber wrapping to make up each of the pair of chords.

5. A composite skin-spar joint as in claim 4 further comprising: the face sheet reinforcement of fibers oriented in a spanwise direction, and the thickness of face sheets and honeycomb varying within the chord with the face sheets increasing in thickness and the honeycomb having a corresponding decrease in the thickness along the span as the load increases.

6. A composite skin-spar joint as in claim 5 wherein the face reinforcement and the fiber for the wrapping are of graphite and the honeycomb is of glass fabric in an epoxy resin.

7. A composite skin-spar joint as in claim 3, further comprising the intermediate second core having crisscrossing reinforcing to resist torsional loads.

8. A composite skin-spar joint as in claim 3 wherein the second reinforcing core comprises: a top and bottom face sheet of reinforced plastic, a nonmetallic crisscrossing honeycomb between the face sheets and a resin impregnated fiber wrapping to make up the second core.

9. A composite skin-spar joint as in claim 8 wherein the face sheet reinforcement and the wrapping are of graphite fibers and the honeycomb is glass fibers in an epoxy resin.

10. A composite wing spar joint comprising: a resin impregnated woven fabric having two spaced apart panels to extend the length of span and an intersecting panel that extends between, becomes interwoven with, and extends laterally beyond each of the spaced apart panels; a honeycomb core to extend between the two panels and adjacent one side of the intersection panel; a formed core between the two panels and adjacent the opposite side of the intersecting panel with the formed core having a center of honeycomb aligned in a crisscrossing direction, a reinforced resin layer above and below the honeycomb, and a covering of wound resin impregnated reinforcement fibers; a pair of reinforcement members located on opposite sides of the formed core and adjacent the intersecting fabric panel with each reinforcement member having a center of honeycomb, a load bearing resin impregnated reinforced layer above and below the honeycomb and a resin impregnated would fiber reinforcement covering; and the units are all cured into a composite wing spar joint.

11. A composite skin-spar joint as in claim 10 further comprising: the spaced apart panels of the woven fabric having the spacing increase as the panels extend outward, and each reinforcement member having means for varying load bearing properties in a spanwise direction.

12. A composite skin-spar joint as in claim 11 wherein the means for varying the load bearing properties in the reinforcement members comprise: the reinforcement in the load bearing layer having reinforcing fibers aligned in the spanwise direction, and the thickness of the load bearing layer with respect to the thickness of the honeycomb layer varies with the reinforced layers increasing in thickness and the honeycomb decreasing accordingly in thickness as the load bending moment increases.

13. A composite skin-spar joint as in claim 12 further comprising resin impregnated glass fibers for the honeycomb, graphite fiber for the reinforcements and an epoxy for the resin.

14. A method of making a composite skin-spar joint, with the steps comprising: placing three matching shaped reinforced plastic cores side by side, bringing a resin impregnated interwoven fabric against the cores with an upright section between and extending above the cores and an interwoven transverse section on top of the cores, placing a fourth core above the central core and contacting the transverse section and the extensions of the woven fabric and moving the cores with contacting fabric through a curing section of a microwave generator for setting up the resin and forming a composite skin-spar joint.

15. A method of making a composite skin-spar joint as in claim 14 with further steps comprising: preparing the two outside core members by laying up epoxy resin impregnated graphite fibers with a gradual variance in thickness of the lay-up, securing honeycomb onto the lay-up, trimming the honeycomb, placing a matching lay-up of epoxy resin impregnated graphite fibers with a gradual variance in thickness of the lay-up onto the trimmed honeycomb, and wrapping epoxy impregnated graphite fibers around the joined member to form the outside cores.

16. A method of making a composite skin-spar joint as in claim 15 with further steps comprising: preparing the centrally located core by placing a layer of resin impregnated graphite fibers above and below honeycomb utilizing a crisscrossing structure, and wrapping epoxy impregnated graphite fibers around the layers and honeycomb forming a core.

* * * * *